Figure 1:
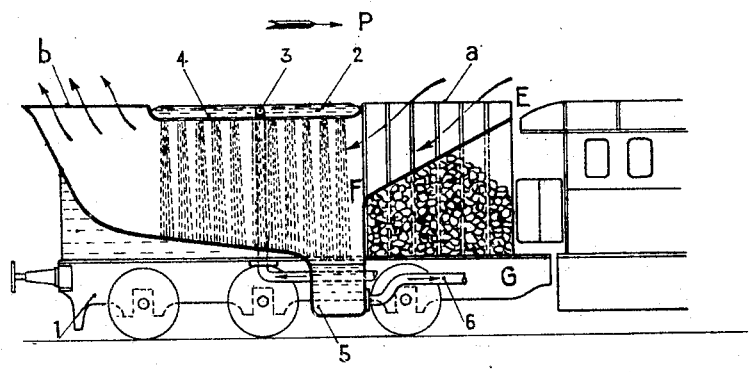

H. BOLTSHAUSER.
MEANS FOR RECOOLING WATER.
APPLICATION FILED DEC. 29, 1919.

1,365,148.

Patented Jan. 11, 1921.

Inventor:
Heinrich Boltshauser,
By Henry Orth
Atty.

UNITED STATES PATENT OFFICE.

HEINRICH BOLTSHAUSER, OF ZURICH, SWITZERLAND.

MEANS FOR RECOOLING WATER.

1,365,148.  Specification of Letters Patent.  Patented Jan. 11, 1921.

Application filed December 29, 1919. Serial No. 347,901.

*To all whom it may concern:*

Be it known that I, HEINRICH BOLTSHAUSER, a citizen of the Republic of Switzerland, residing at Zurich, Hardturmstrasse 19, Switzerland, have invented certain new and useful Improvements in Means for Recooling Water for the Condensation of Steam on Vehicles; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to means for recooling water for the condensation of steam on vehicles, the axis of which channel lies in the main in the direction of running and through which the water to be re-cooled flows transversely. According to this invention, the channel is, when working normally, in its front part open to the front as well as to the sides. The arrangement is made such, that on encountering a high side-wind, that part of the entrance opening which is at the lee-side, may be at least partly shut. The coal-bunker necessary for the working of the vehicle with steam may be built wedge-shaped and co-axially in the front part of the air-channel.

The special advantages may be explained when entering on the details of the exemplification of this invention diagrammatically shown on the drawing, on which—

Figure 2:
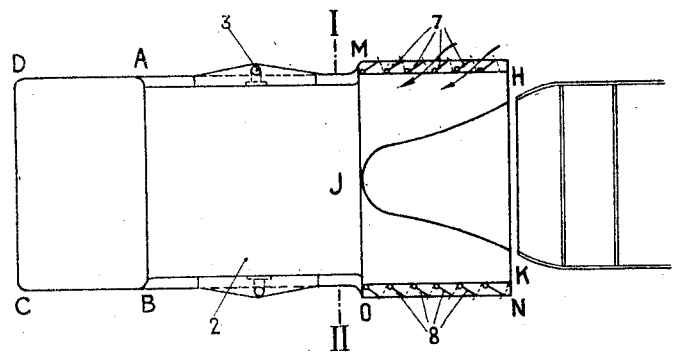

Figure 1 is a vertical longitudinal section,

Fig. 2 represents a plan of a steam-locomotive tender which is moving in the direction of arrow P. On the frame 1 of the tender, provided with three axles, the water re-cooling device and the coal-bunker are arranged. The re-cooling device consists in the main of an air-channel *a—b* and of a guiding-device for the water. The air-channel is of rectangular section in the rear third of its length that is approximately from line I—II of Fig. 2 up to the discharge-section A—B—C—D. Into the entrance of the air-channel the coal-bunker is built in, which is chiefly of a triangular-like shape E—F—G in the vertical longitudinal section (Fig. 1) and of a triangular-like shape H—J—K in the horizontal section (Fig. 2).

As may be seen in Fig. 2 the coal-bunker provides space between its outer wall and each of the outer walls of the air-channel for entrance openings into which the current of air produced by the speed of the vehicle may enter either directly from the front or obliquely from the sides, whereupon it flows through the air-channel in a horizontal direction, is deflected toward the top in the rear part and leaves the channel through the opening A—B—C—D. The water heated up in the condensation is pumped through pipe 3 into the reservoir 2 arranged above a channel in a manner shown in the application Ser. No. 327048. It may flow freely downward through the perforated bottom 4 of said reservoir, whereupon it is cooled by means of the transversely flowing air-current. The cooled water is collected at the bottom of reservoir 5 and is thereupon conducted back by means of pipe 6 to the condensing arrangement for producing a new cooling effect.

If a high side-wind is blowing during the run coming from the side I (Fig. 2) for instance, the great danger exists that an air current transversely to the longitudinal axis of the tender is generated which issues again at the side II thus flowing not at all or only to a small degree along the channel and which does not exert any cooling effect on the water. This is especially the case, if, as may be seen in Fig. 2, the coal-bunker of the section H—J—K is not provided and therefore the possibility exists that the side-wind passes without restriction from the part L—M of the opening on side I directly to the part N—O of the opening on side II transversely through the whole tender. In order to prevent this, the side parts L—M and N—O of the entrance opening may for example be provided with pivoted or rotatable narrow vertically arranged strips of sheet metal or shutters 7 and 8 respectively. If the wind blows from the direction of side I, the sheet-metal strips 8 are turned toward the direction of running by means of a lever apparatus not shown in the drawing, whereby the part N—O is closed and the air required for cooling the water enters the channel from the left side only, that is through the front part H—L and the side part L—M as well as through the front N—K on the right side which is left open to a small extent.

I claim:

1. In a device for re-cooling water for the condensation of steam on vehicles, an air-channel, the axis of which is in the main arranged in the direction of running whereby the speed of the vehicle produces the necessary air-current, means to cause the water to be re-cooled to pass transversely through the channel and means arranged in the fore part of the air channel to provide for the entrance of the air from the front and from the sides when working normally.

2. In a device for re-cooling water for the condensation of steam on vehicles, an air-channel, the axis of which is in the main arranged in the direction of running whereby the speed of the vehicle produces the necessary air-current, means to cause the water to be re-cooled to pass transversely through the channel and means arranged in the fore part of the air channel to provide for the entrance of the air from the front and from the sides, the latter means being provided with a device for adjusting the sectional area of the entrance.

3. In a device for re-cooling water for the condensation of steam on vehicles, an air channel the axis of which is in the main arranged in the direction of running whereby the speed of the vehicle produces the necessary air-current, means to cause the water to be re-cooled to pass transversely through the channel, and means arranged in the fore part of the air channel to provide for the entrance of the air from the front and from the sides, the latter means being provided with a device for adjusting the sectional area of the air passages on encountering a high side-wind at the lee-side.

4. In a device for re-cooling water for the condensation of steam on vehicles, an air-channel, the axis of which is in the main arranged in the direction of running whereby the speed of the vehicle produces the necessary air-current, means to cause the water to be re-cooled to pass transversely through the channel, means adapted to provide for the entrance of the air from the front and from the sides, the front part of the air channel being arranged to provide a wedge-shaped channel hollow space to be used as a coal-bunker.

5. In a device for re-cooling water for the condensation of steam on vehicles, an air channel the axis of which is in the main horizontal, means to cause the water to be re-cooled to pass transversely through said channel, openings at the front end of said channel to admit air thereto, and a shutter to control the admission.

6. In a device for re-cooling water for the condensation of steam on vehicles, an air channel the axis of which is mainly horizontal, means to cause the water to be re-cooled to pass transversely through said channel, said channel having front air entrance openings and side air entrance openings, shutters controlling the side openings, and a coal bunker included in the side and front openings.

7. In a device for re-cooling water for the condensation of steam on vehicles, an air channel the axis of which is mainly horizontal, said channel having a substantially horizontal inlet and exit at its ends, and front air inlets and lateral air inlets, and a coal bunker included between said lateral inlets and said front inlets.

In testimony that I claim the foregoing as my invention, I have signed my name.

HEINRICH BOLTSHAUSER.